United States Patent [19]
Vartiainen et al.

[11] Patent Number: 4,872,892
[45] Date of Patent: Oct. 10, 1989

[54] AIR PURIFIER

[75] Inventors: Seppo Vartiainen, Kouvola; Erkki Aalto, Kausala, both of Finland

[73] Assignee: Halton Oy, Finland

[21] Appl. No.: 245,795

[22] Filed: Sep. 16, 1988

Related U.S. Application Data

[63] Continuation-in-part of Ser. No. 46,243, May 5, 1987, abandoned, which is a continuation of Ser. No. 803,066, filed as PCT FI85/00025 on Mar. 8, 1985, published as WO85/04114 on Sep. 26, 1985, abandoned.

[30] Foreign Application Priority Data

Mar. 9, 1984 [FI]  Finland ................... 840978

[51] Int. Cl.$^4$ ............................................. B01D 45/12
[52] U.S. Cl. ........................................ 55/345; 55/443; 55/447
[58] Field of Search ................. 55/343, 345, 346, 440, 55/443, 444, 447-450

[56] References Cited

U.S. PATENT DOCUMENTS

| | | | |
|---|---|---|---|
| 2,039,692 | 5/1936 | van Tongeren | 55/345 |
| 2,701,056 | 2/1955 | Morton | 55/345 X |
| 2,752,001 | 6/1956 | Muller | 55/343 X |
| 4,375,365 | 3/1983 | Muller et al. | 55/346 |

FOREIGN PATENT DOCUMENTS

| | | | |
|---|---|---|---|
| 0460983 | 5/1928 | Fed. Rep. of Germany | 55/444 |
| 0471267 | 5/1952 | Italy | 55/444 |

OTHER PUBLICATIONS

Dustex Corporation publication form No. 12159, received Group 1804-25-66.

Primary Examiner—Charles Hart
Attorney, Agent, or Firm—Steinberg & Raskin

[57] ABSTRACT

An air purifier intended for use, e.g., as a grease filter in air venting systems. The purifier comprises a plurality of modules operating according to centrifugal separation, each module comprising at least one vortex chamber. Gas flow entering the vortex chamber is set into helical motion therewithin, such that the gas flows through the vortex chamber in a single direction, substantially perpendicular to a direction in which the incoming gas flow is introduced into the module.

1 Claim, 6 Drawing Sheets

1 - GREASE-LADEN EXHAUST AIR ENTERS FILTER
2 - GREASE PARTICLES ARE EXTRACTED AS THE EXHAUST AIR TRAVELS ALONG THE FILTER WALLS BY CYCLONE PRINCIPLE.
3 - CLEAN AIR EXITS FILTER

FIG. 13

AIR PURIFIER

The present application is a continuation-in-part of co-pending application Ser. No. 046,243 filed May 5, 1987 and now abandoned which is in turn a continuation of co-pending application Ser. No. 803,066 filed as PCT FI85/00025 on Mar. 8, 1985, published as WO85/04114 on Sep. 26, 1985, and now abandoned.

BACKGROUND OF THE INVENTION

The present invention concerns an air purifier intended to be used, for instance, as a so-called grease filter in the air venting systems of institutional, bar, grill room and restaurant kitchens or equivalent spaces, said air purifier comprising a purifier part which has of two or more air purifying modules operating on the centrifugal separation principle, each of them having one or several vortex chambers, and air purifier frame structures, if any.

An important field of use of air purifiers is the so-called grease filters. Through the grease filters, spoiled air is drawn in connection with food preparation. In professional kitchens, such as restaurant, grill room and institutional kitchens, the air that is spoiled in connection with the preparing of food causes a special problem.

The grease filter separates grease and other impurities from the vapors and gases produced when food is being prepared and in this way prevents the entry of these inflammable and otherwise harmful substances in the ventilation system. The grease filter is most often placed in air venting means over the stove or equivalent. Several grease filters may be used side by side.

The object of the grease filters is to prevent the duct systems and fans from becoming dirty and thus to reduce the need for cleaning the ventilation system and to improve fire safety and hygiene. The following requirements, among others, are imposed on a grease filter; naturally, good filtering capacity. The degree of self-cleaning of the filters based on running down of the accumulated grease should be as good as possible. The filter cleaning period should be long without increasing the resistivity of the filter or altering its cleaning efficiency. The filter should be easy to service and to inspect. The filter should present the highest possible fire safety and hygienic standard.

The filter should also be durable and user-friendly.

At a present, so-called impact filters are commonly used for grease filters which consist of mutually superimposed metal nets or of nets and a metal fiber mat. A drawback of these kinds of filters is that their separating capacity is usually too low. The filter needs frequent servicing because the grease adheres to the filter material instead of running down into the grease groove. Cleaning is difficult. These drawbacks also have the consequence that fire hazard increases, and the specific pressure loss increases significantly in comparison with a clean filter, whereby the quantity of vented air decreases and the quality of the indoor air deteriorates. The service life of such filters is relatively short. They are easily damaged at mounting, in use, or when they are being cleaned.

For grease filters, so-called centrifugal filters are also used. Present-day centrifugal filters also have comparatively low separating capacity, owing to their construction. As examples of inappropriate shaping of the elements in grease filters, the U.S. Pat. Nos. 3,834,135; 3,910,782; and 3,566,585 may be mentioned. Their construction is also unnecessarily complex and the filter is relatively expensive for this reason. The separating capacity of centrifugal filters as well as impact filters varies greatly in practice, depending on the amount of air flow. Attempts have been made to eliminate this drawback by means of adjustable filters. When several adjustable filters are used with different settings in one kitchen, there is a risk that they become mixed up e.g. after washing.

Figure 1:
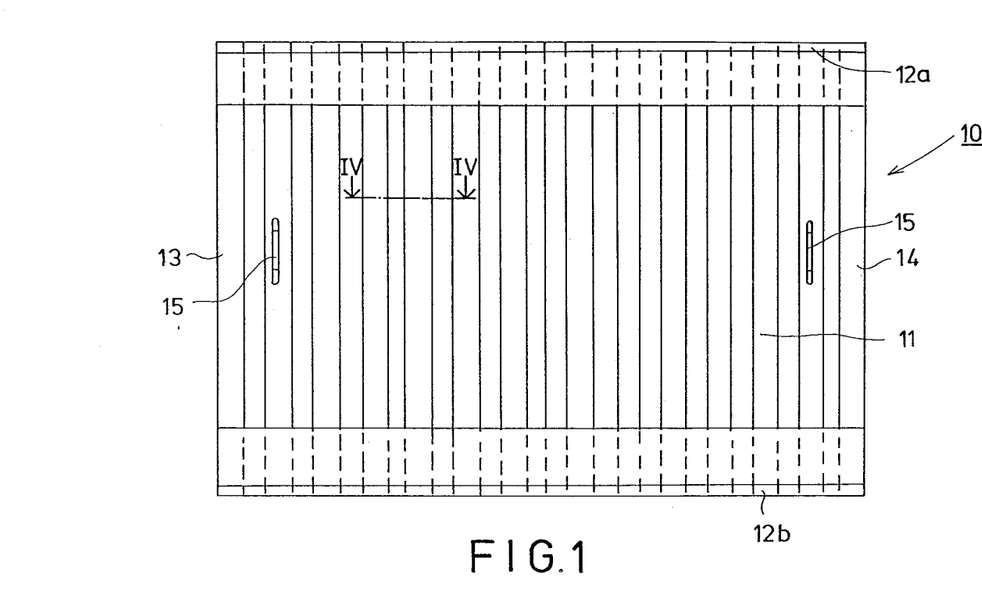
FIG. 1 presents an advantageous embodiment of the air purifier of the invention in front view.
Figure 4:
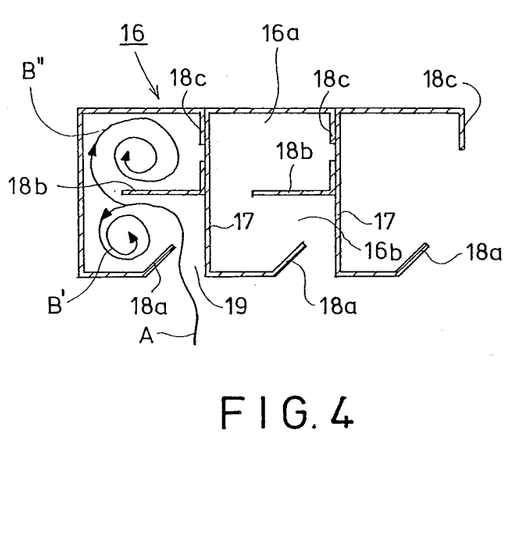
FIG. 4 shows the section along line IV—IV in FIG. 1.
Figure 6:
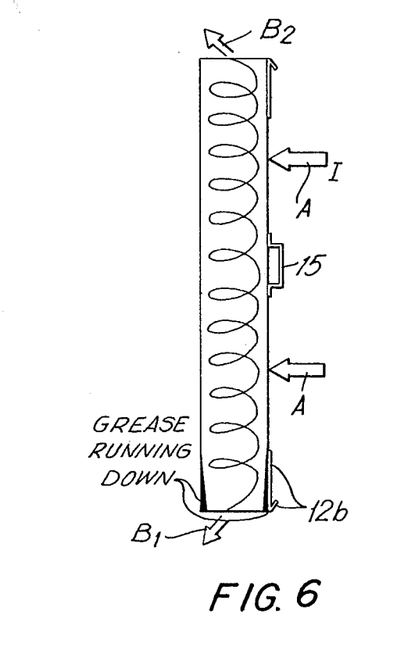
FIG. 6 is a schematic representation of the operation of the air purifier of the present invention in accordance with a side elevational view of an alternative embodiment thereof.
Figure 7:
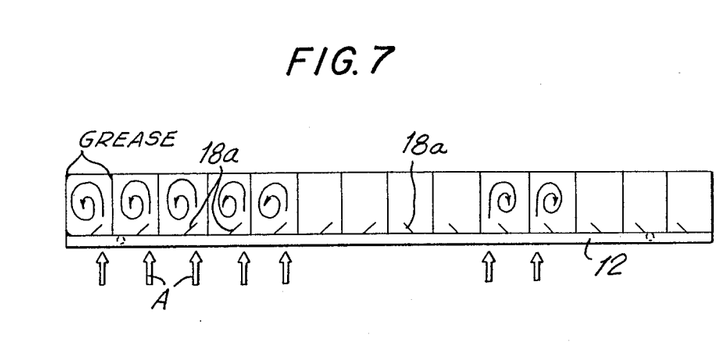
FIG. 7 is a schematic representation of the operation of the air purifier of the present invention in accordance with a top view of the alternative embodiment of FIG. 6.

GB-A-2,092,483 teaches a conventional air purifier with centrifugal separators, where the outlet pipes 22 (FIGS. 4, 6 and 7) are merely central tubes or conduits of a conventional cyclone separator. It is emphasized that the direction of flow of a gaseous fluid reverses by 180° in the conduits 22. This is best seen in FIGS. 4, 6 and 7, as denoted by the arrow Q3. Accordingly, this known air purifier suffers from a strong tendency to become clogged. Additionally, the air purifier according to GB-A-2,092,483 has a comparatively complicated structure, wherein a flow channel 12 extends over the entire length of the air purifier supplying air flow into each particular vortex chamber 4, 6, 8, 10 (FIG. 1). The particulates separated from the air flow continue to flow toward the outlet 20. Furthermore, as explicitly illustrated in GB-A2,092,483, the start of the escape point, or the inner end of the central tube 22 of the cyclone separator, is centered therewithin.

Certain advantages are however achieved with centrifugal filters. The service life of centrifugal filters is in general rather long. The filter efficiency also does not deteriorate as a consequence of repeated washing as is the case with fiber filters. The fire safety of centrifugal filters is also better than that of fiber filters.

In the centrifugal filters known in the art, the air flow turns 180° in the lower cyclone cone, after which the air flow exits from the cyclone through the central tube. For this reason the filtering capacity is rather low and does not increase significantly after the change of direction. It is true that the separating capacity can be somewhat improved with the aid of vortices. The centrifugal filter does not store grease in the filter because the separated grease runs off efficiently. However, other solid particles also usually accompany the grease, e.g. dirt, dust, etc., and in this case the respective impurity is no longer freely flowing and fails therefore to run off even a slippery surface. This is the reason why existing centrifugal filters may become clogged.

Currently, such grease filters are also in use in which two consecutive filters are used. These so-called two-phase filters are good in principle, but if in both filters both phases are filtering out the same particle size, then the latter phase is unnecessary in practice because the filtering capacity only increases about 1% in comparison with the filtering capacity of the first filter.

SUMMARY OF THE INVENTION

The object of the invention is to produce an air purifier superior to the grease filters known in the art operating on the centrifugal principle.

A more detailed object of the invention is to provide an air purifier which is an eminently useable so-called coarse filter, in which group the grease filters are classified.

Another object of the invention is to provide an air purifier having sufficient separating capacity, whereby the soiling of ducts and blowers is prevented.

Still another object of the invention is to provide an air purifier having a hollow construction, so that even great quantities of grease may be allowed to accumulate in it without any consequent derangement of function, and which is also easy to service, free of fire hazard, reliable in operation, safe in installation, and which substantially lengthens the service life of fine filters if in the design a fine filter is also employed in addition to the coarse filter.

The aims of the invention are achieved with an air purifier which is mainly characterized in that the air flow entering through each inlet aperture of the air purifier modules is, with the aid of the differential pressure $\Delta_p$ across the air purifier, set in the vortex chamber of each air purifying module into one or several helical motions proceeding, with reference to the cross-section of each vortex chamber, in substantially the same perpendicular direction.

The chambers may be placed in parallel, and there may be a partition between the chambers.

The chambers may be divided with a guide baffle into at least two partial chambers.

The other characteristic features of the air purifier of the invention are presented below.

With the air purifier of the invention, all those desirable properties are attained which are required from a good grease filter. The filtering capacity of the air purifier of the invention is good, the air purifier is easy to service, the air purifier causes no fire hazard, and the air purifier is highly reliable in operation.

BRIEF DESCRIPTION OF THE DRAWINGS

The invention is described in detail referring to an embodiment of the invention presented in the figures of the attached drawings, but to which the invention is not intended to be exclusively confined.

DESCRIPTION OF THE PREFERRED EMBODIMENTS

Figure 2:
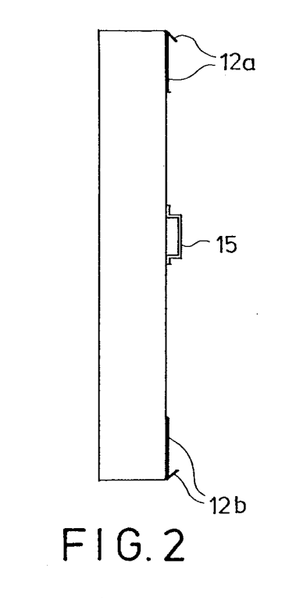
FIG. 2 presents the air purifier of FIG. 1 in side elevational view.
Figure 3:
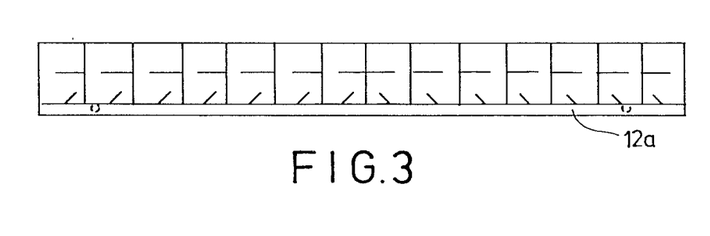
FIG. 3 presents the air purifier of FIG. 1 in top view.

In the embodiment depicted in FIGS. 1-3, the air purifier of the invention in general has been indicated by reference numeral 10. In this embodiment the air purifier 10 comprises a purifier part 11, a top collar 12a and a lower collar 12b. Side collar 13 and 14 serve the sidemost chambers 16. The handle is indicated by reference numeral 15.

As taught by the basic idea of the invention, the purifier part 11 has been composed of separate modules which in FIG. 4 are generally indicated by reference numeral 16. The modules are separated by a partition 17, to which the separate modules 16 are attached with a beak-like member 18c by any fixing method known in itself in the art. In this embodiment, grease separation from the incoming air flow, in FIG. 4 indicated by the arrow A, takes place in the modules 16 placed in parallel. As is seen in FIG. 4, the air flow A is caused to rotate in separate vortex chambers 16a, 16b without change of the direction of rotation. As a result a highly efficient separation effect is obtained with relatively low air flow velocities, the degree of separation of particles over 5 $\mu$m being about 95% and that of particles over 2.5 $\mu$m still about 50%.

In the embodiment of FIG. 4, the modules 16 have been divided with a guide baffle 18b into two vortex chambers 16a and 16b in which vortices are produced, indicated in FIG. 4 by arrows B' and B". As is observed in FIG. 4, the air flows B', and B" in the vortex chambers 16a and 16b are helical rotary motions. As illustrated in FIG. 4, the air flows B', B" proceeding in the same direction have opposite directions of rotation inside the vortex chambers 16a, 16b.

Figure 5:
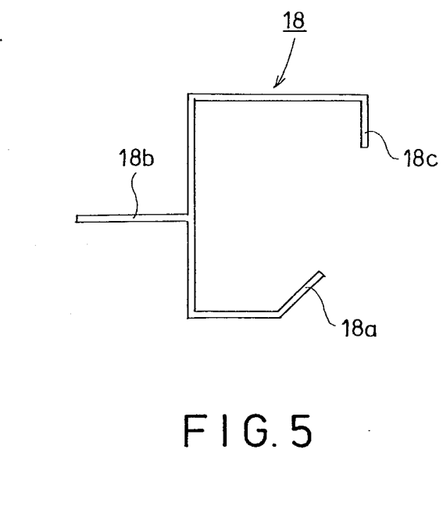
FIG. 5 presents in cross section the cell structure used in the air purifier of the invention in accordance with FIGS. 3 and 4.

In FIG. 5 an advantageous embodiment of the modular design is presented. In this embodiment, the structure 18 of the module 16 includes beak-like parts 18a and 18c. The beak-like member 18a of the structure 18 of the module 16 defines, as seen in FIG. 4, a flow slit 19 of size less than about 10 mm, so that most efficient separation possible might be obtained. The size of the flow slit 19 is advantageously in the range of about 3-8 mm.

In the air purifier 10 of the invention, the helical motion B may be made such that air emerges from the air purifier 10 both from top and from below. Furthermore, the air purifier 10 of the invention is characterized in that the helical rotary motion B', B" continues a certain distance after leaving the air purifier 10. The escaping air flows B', B" may be disposed to take place from the top and from under the air purifier 10.

In FIGS. 6 and 7, the incoming air flow A and the outgoing flows $B_1$ and $B_2$ are illustrated. The helical flows within the purifier modules are indicated in FIGS. 6 and 7.

The incoming air flow, which contains impurities such as grease, for example, is thrown at the walls of each vortex chamber, and the air free of impurities escapes along both lower and top flows $B_1$ and $B_2$ respectively. If the incoming air flow A is below the center line of the air purifier 10, the air free of impurities escapes along the lower flow $B_1$.

Similarly, if the incoming air flow A is above the center line of the air purifier 10, the air escapes along the top flow B$_2$. The direction of rotation of the vortex in the vortex chamber depends on the orientation ad location of the beak-like guide member 18a. In FIG. 7, the direction of rotation of the vortex is counter-clockwise in the chambers at the left side of the center line and, similarly, the direction of rotation of the vortex is clockwise in the chambers at the right side of the center line.

It is to be particularly noted that the grease as a heavy component always runs downwards throughout the entire wall structure of a vortex chamber, while the lighter air purified of grease may flow out either from below or the top in the flows B$_1$ and B$_2$ respectively. In the air purifier according to the invention, it is very important that each vortex chamber comprises means 17, 18a for setting the incoming gas flow within the vortex chamber 16a into the helical motion, such that the gas flows through the vortex chamber 16a only in directions substantially perpendicular to the direction in which the incoming gas flow is introduced through the inlet aperture 19. Great quantities of grease may therefore be allowed to accumulate in the air purifier according to the invention without any damage to its operation.

Thus, this air purifier is quite easy to service, reliable in operation, safe to install and free of any fire hazards. Its service life is also greatly extended as compared to the service lives of the cyclone separators previously used. Highly efficient separation may be obtained with relatively low air flow velocities. The degree of separation of particles over 5 microns is about 95%, while the degree of separation of particles over 2.5 microns is still about 50%

The escape points in the structure of the air purifier according to the present invention are away from the separation portion whereas in GB-A-2,092,483 the start of the escape point or the inner end of the central tube 22 of the cyclone separator is centered therewithin.

Figure 8:
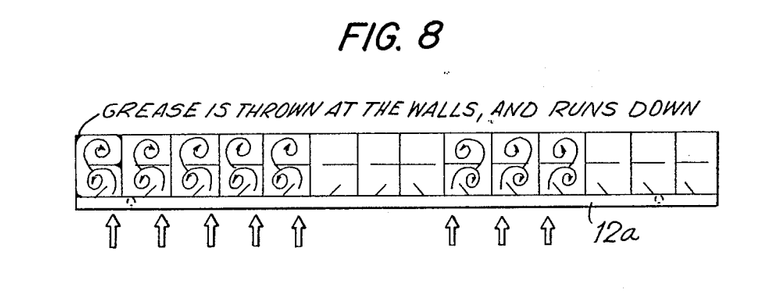
FIG. 8 is a schematic representation of the operation of the air purifier of the present invention in accordance with FIG. 3.
Figure 9:
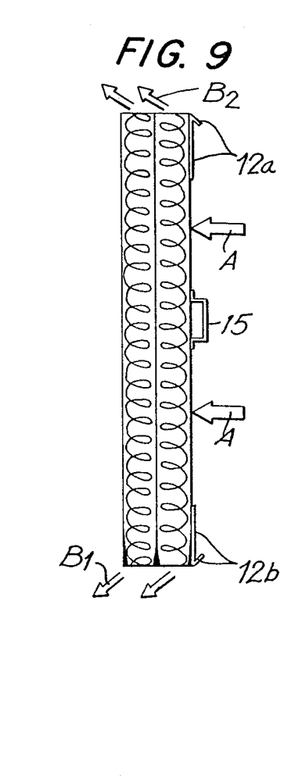
FIG. 9 is a schematic representation of the operation of the air purifier of the present invention in accordance with FIG. 2.

In FIGS. 8 and 9, the air inflow has been indicated with symbol A, and similarly the air outflow has been denoted with symbols B$_1$ and B$_2$. The helical flows are indicated in FIGS. 4, 8 and 9. The operation of the illustrated apparatus in FIGS. 8 and 9 is similar to the alternative embodiment in FIGS. 6 and 7 as follows. The incoming air which contains impurities, such as, for example, grease, is thrown at the walls of each vortex chamber, and the air free of impurities escapes both from below and above in flows B$_1$ and B$_2$ respectively. If the incoming air flow A is below the center line of the structure 10 of the invention, the air free of impurities escapes from below in flow B$_1$. Similarly, if the incoming air flow A is above the center line of the structure 10, the flow escapes from above in flow B$_2$. The direction of rotation of the vortex in the vortex chambers 16a, 16b depends on the orientation and location of the beak-like member 18a.

In FIG. 8 (as in FIG. 7), the direction of rotation of the vortex is counter-clockwise in the chambers at the left side of the center line and, similarly, the direction of rotation of the vortex is clockwise in the chambers at the right side of the center line. It is to be particularly noted that the grease as a heavy component always runs downwardly throughout the entire wall structure of a chamber, while the lighter air purified of grease may flow out either from below or above in the flows B$_1$ and B$_2$ respectively. The force driving the air flow A into the purifier 10 of the invention depends on the p used. The differential pressure $\Delta p$ must generally be between about 25 and 150 pascal. It is particularly noted that it is disadvantageous to use too great a $\Delta p$ which would result in deterioration of the purification effect. Likewise, it is disadvantageous to use too small a $\Delta p$, which would result in decrease of the separation efficiency.

Figure 10:
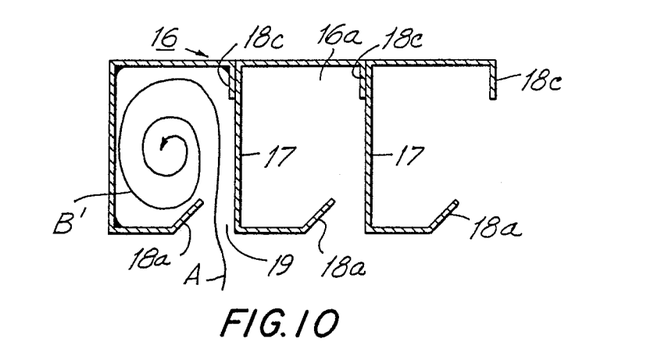
FIG. 10 is a sectional view similar to FIG. 4, of the alternative embodiment of FIGS. 6 and 7.
Figure 11:
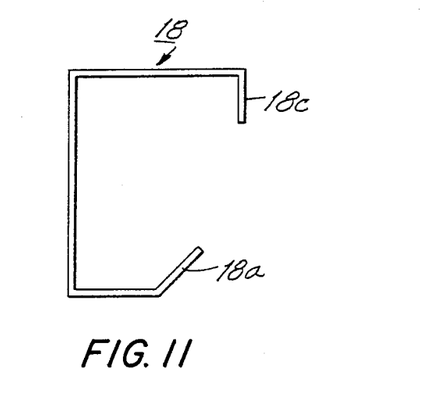
FIG. 11 is a cross-sectional view of the cell structure used in the alternative embodiment of FIGS. 6, 7, and 10.

The vertical outflow is denoted in FIG. 10 by B'. The embodiment illustrated in FIGS. 10 and 11 essentially corresponds to the embodiment illustrated in FIGS. 4 and 5, but with omission of guide baffle 18b. Therefore, only a single helical flow B' generated in each respective module 16. Accordingly, similar components have been denoted by the same reference numerals. The rotational direction in a single duct or chamber 16a or 16b is always the same, even though there are opposite overall translational flows from one another, as best seen in FIGS. 6 and 9.

The air purifier of the present invention may be utilized in conjunction with an air exhausting device described in U.S. patent application Ser. No. 010,277 filed Dec. 5, 1986 which is incorporated by reference herein. In other words, the air purifier of the present invention may be positioned in the device of U.S. Ser. No. 010,277 so that appropriate air flow is "captured" and directed toward the air purifier with appropriate $\Delta p$. $\Delta p$ can be regulated with a blower forming part of the device disclosed in U.S. Ser. No. 010,277, or with a regulating organ in an air conditioning canal system that is known per se.

Figure 12:
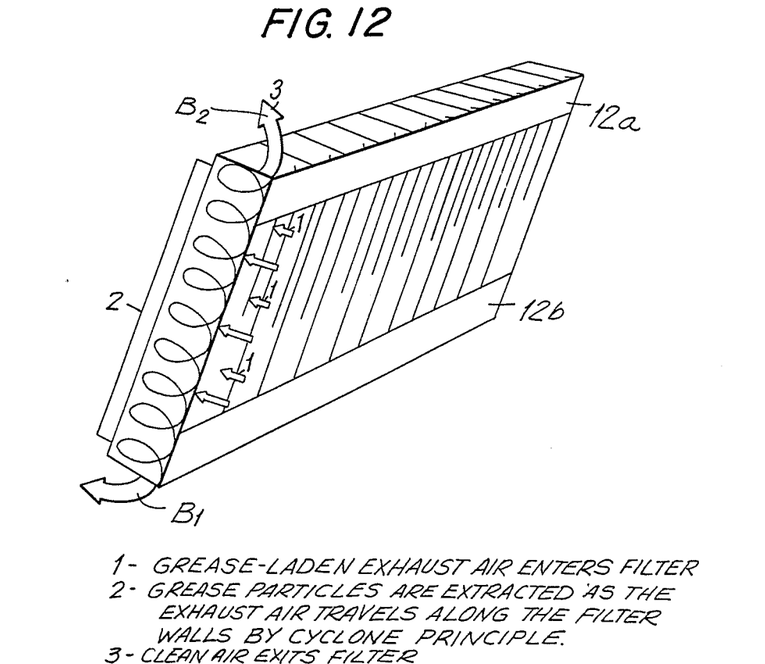
FIG. 12 is a perspective view of the air purifier of the present invention illustrating operation thereof.
Figure 13:
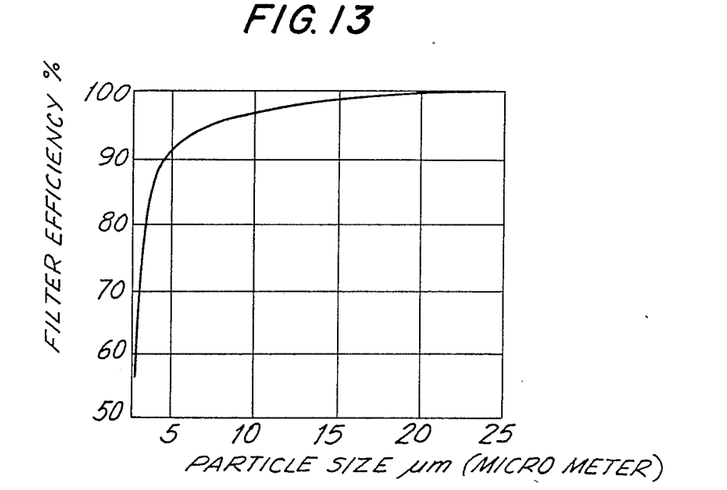
FIG. 13 is a graph of separation efficiency that is attainable with the air purifier of the present invention.

FIG. 12 is a perspective view of the air purifier of the present invention, illustrating the separation principles that are accomplished herewith. More specifically, the air purifier of the present invention may be obliquely positioned as illustrated in FIG. 12, e.g. in the device of U.S. Ser. No. 010,277, and accomplish the separation of particles from gas (air) flow as illustrated herein. Such separation is especially effective as noted above, and as illustrated in the graph of FIG. 13.

The rotation of flows B', B" are in the opposite directions from one another, as illustrated in FIG. 4. However, these rotational flows B', B" may be in the same direction, if baffle 18b is moved to the opposite partition wall 17. In other words the rotational directions of flows B' and B" are determined by baffle 18b.

Figure 14:
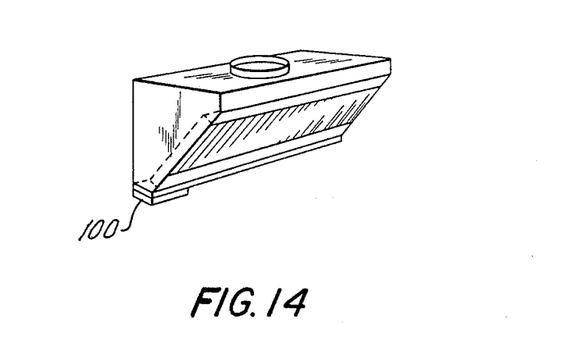
FIG. 14 is a perspective view of the air purifier of the present invention, illustrating a collecting vessel for particulates or grease.

The separated grease particles are thrown against the inner walls of the separate or air purifier and run down in a liquid flow into a collecting vessel 100 as illustrated in FIG. 14. This vessel is periodically emptied. Such a collecting vessel is also exemplified by grease channel 14 in U.S. Ser. No. 010,277.

Italian Pat. No. 471,267 discloses a separator based upon impact. According to FIGS. 1, 2, and 4 of this reference, gas flows through an aperture 2 into the separator and collides with the plates 7 within the separator itself. The plates 7 are shaped to have curved edges 9. The shape of these edges 9 naturally produces a turning movement, however, the thus-produced turning movement is stable, i.e. does not move downwardly or upwardly, but continues flow in the incoming direction. In other words, the resulting flow thereof is not perpendicular to the incoming direction through inlet 2, but is rather substantially parallel to this incoming direction of flow. Only a continuous, successive turning in different directions occurs in the incoming flow of this reference.

The resulting flow then exits through an aperture 3 from the separator in the Italian Pat. No. 471,267. According to the structure and procedure taught in this reference, the flow direction of gas from the inlet aperture 2 to the outlet aperture 3, remains unchanged, as best seen by the arrows in FIGS. 1 and 2 of this reference.

More specifically, it is immediately clear from FIG. 1 of this reference that the incoming flow 2 and exhaust flow 3 are in the same plane and parallel to each other, unlike the structure of the present invention where the incoming gas flow A is in a different plane from the plane of the exhaust gas flows $B_1$ and $B_2$. In other words the flows A and $B_1$, $B_2$ are not parallel and are in different planes such that the flows and consequently the flow planes are perpendicular to one another.

Referring to FIG. 4 of this reference, it is immediately seen that the incoming flow 2 turns in the purifier part 6 through 90°, then through 90°, and further through 90°, etc. in a succession of different directions. However both the incoming flow 2 and the exhaust flow 3 are always in the same plane, with the exhaust flow 3 always being parallel to the incoming flow 2. Accordingly, there is actual no rotary flow created in the purifier section 6 which at all resembles rotary flows $B_1$, $B_2$, much less any such flow which is perpendicular to the direction of the incoming flow.

While flow is naturally changed slightly sidewardly at the edges 9 of the plates 7 (FIG. 4 of this reference) when the gas flow passes between the various plates 7 as illustrated, the flow still remains in the same plane as the incoming direction of flow.

It is emphasized that the purifier or separator of the present invention is based upon centrifugal separation principles whereas the separator taught in Italian Pat. No. 471,267 is based upon impact principles, i.e. is a so-called plate impact separator.

In the foregoing, a few advantageous embodiments of the invention have been presented and it is clear to a person skilled in the art that numerous modifications thereof are feasible within the scope of the inventive idea stated above.

What is claimed is:

1. An air purifier (10) comprising a purifier part (11) having at least two air purifier modules (16) being placed substantially in parallel to each other and operating on the centrifugal separation principle, each of said modules having at least one vortex chamber (16a, 16b), a partition (17) separating said air purifier modules (16) from each other, an inflow aperture (19) and an outlet, wherein each vortex chamber (16a, 16b) extends along an entire length of a longitudinal dimension of said air purifier module (16), said inflow aperture (19) is positioned to co-operate with said partition (17) and with a guide member (18a) to direct each air flow (A) entering said purifier part (11) through one of said inflow apertures (19) to proceed in a constant helical motion (B', B'') to said outlet of said air purifier module (16), such that said air flow (A) through said vortex chamber (16a, 16b) is only in a direction substantially perpendicular to the direction in which said air flow (A) enters through said inflow aperture (19).

* * * * *